United States Patent [19]

Plisky et al.

[11] 3,952,360

[45] Apr. 27, 1976

[54] INTEGRAL RETAINING CLIP-REFILL ASSEMBLY

[75] Inventors: John J. Plisky, Munster; William H. Harbison, both of Merrillville, Ind.

[73] Assignee: The Anderson Company, Gary, Ind.

[22] Filed: Mar. 25, 1975

[21] Appl. No.: 561,908

[52] U.S. Cl. .............................................. 15/250.42
[51] Int. Cl.² ............................................ B60S 1/38
[58] Field of Search .................... 15/250.35–250.42; 403/155, 326, 329, 330

[56] References Cited

UNITED STATES PATENTS

| | | | |
|---|---|---|---|
| 2,782,442 | 2/1957 | Krohm | 15/250.42 |
| 2,983,945 | 5/1961 | De Pew | 15/250.42 |
| 3,866,261 | 2/1975 | Stratton | 15/250.42 |
| 3,879,794 | 4/1975 | Roberts, Jr. | 15/250.42 |

OTHER PUBLICATIONS

Fram Corporation, Providence, R.I., *Carton for Wipe Blade Refills*, 15 inch, 1972–1973.

*Primary Examiner*—Peter Feldman
*Attorney, Agent, or Firm*—Wegner, Stellman, McCord, Wiles & Wood

[57] ABSTRACT

A wiper assembly including a wiping element having a flexible support member and a resilient wiping member and a pressure-distributing superstructure connected to said flexible support member for transmitting pressure from a wiper arm to said wiping member. The pressure-distributing superstructure is held assembled to the flexible support member by means of an improved retaining clip carried by one side of said support member. The retaining clip is mounted in a slot in the support member and has an overhanging portion with an angled abutment which, during assembly of the superstructure to the support member, permits a claw on the end of the superstructure to pass the abutment whereupon the claw is trapped behind the abutment for retaining the superstructure on the support member.

5 Claims, 5 Drawing Figures

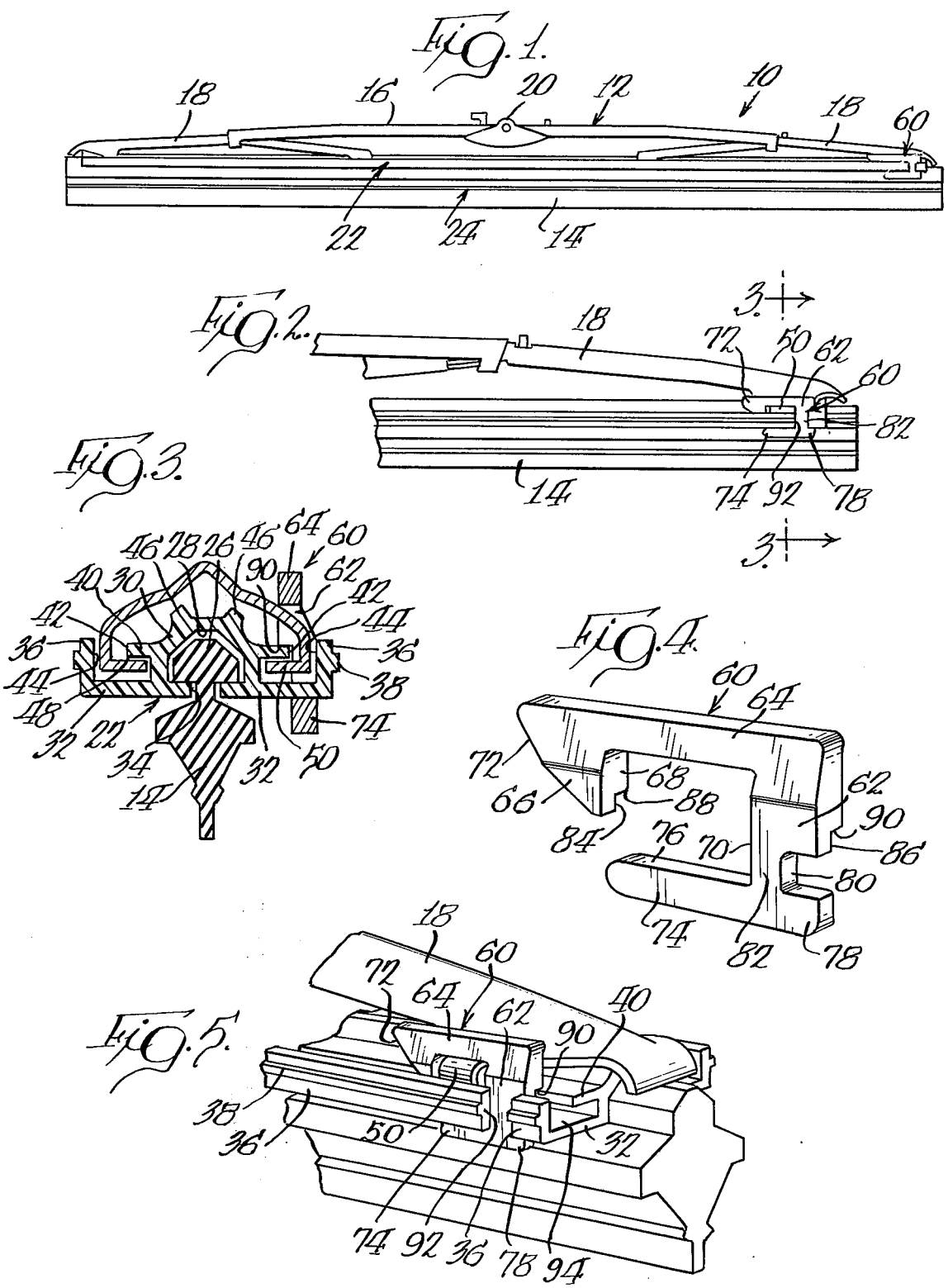

INTEGRAL RETAINING CLIP-REFILL ASSEMBLY

BACKGROUND OF THE INVENTION

1. Field of the Invention

This invention relates to a windhsield wiper blade and, more particularly to an improved apparatus, for retaining the wiping element assembled with the pressure-distributing superstructure.

2. Description of the Prior Art

Since the basic invention of John W. Anderson of a wiper blade for wiping a curved or flat windshield, covered by U.S. Pat. No. 2,596,063, there have been a large number of proposals for making it simple and easy to assemble the articulated superstructure to the wiping element of the wiper blade. In particular there have been many proposals for retaining the superstructure assembled with the backing member of the wiping element by the use of end clips which interact between the backing strip of the wiping element and the end of the superstructure for holding the two in assembled relationship while still permitting the requisite relative movement between the superstructure and the wiping element to properly wipe the windshield.

These prior end clips generally engage with the backing strip and fit over or around the claws on the outboard end of the superstructure. The principal disadvantage of the prior end clips was that they frequently became separated from the backing strip and became lost prior to use and therefore rendered the wiping element useless on a superstructure without some means for attaching the two together. Some of the other disadvantages of the prior end clips had to do with the cost involved in making and forming the end clip and in assembling the clip with the backing strip and also in making the clip functional and operative enough to serve to hold the many different varieties of superstructures on the wiping element.

Recently, there has been introduced on the market, wiper elements that include plastic backing members of different shapes and configurations. One such backing member is shown, described and claimed in U.S. Pat. No. 3,820,188 to John Moorhead and Donald Stratton and assigned to The Anderson Company of Gary, Ind. A clip is provided for use with the structure of the 3,820,188 patent which engages in a slot in the side of the backing strip and bridges from side-to-side of the backing strip to engage around and to secure the claws on the end portion of the articulated superstructure to hold the superstructure assembled with the wiping element. Although the end clip for use with the structure of the 3,820,188 patent functioned and operated completely, successfully, there have been occasions where the clip became lost, once again, rendering the refill wiping element useless until a replacement could be supplied. Since the refill wiping element is generally stocked in gas stations and the like, it is not uncommon for the various personnel in the station to handle the boxes and the refill elements often causing the end clips to become separated from the wiping element and to become lost.

SUMMARY OF THE INVENTION

This invention relates to windshield wiper blades and, more particularly, to a retaining clip for use on the wiping element of a blade for effectively securing a pressure-distributing superstructure to the wiping element.

To overcome the disadvantages of the prior art and, in particular, the prior art wherein the end clip could become separated from the wiping element prior to assembling the superstructure to the blade. An improved clip construction is provided which comprises a body member with an overhanging head portion having a depending abutment. The body member has a foot portion and a cutout in the body member such that with the clip nested in a slot in one side of the backing member, the abutment projects into an opening between an upturned side flange and the projecting end of an outwardly directed flange. The foot portion on the clip engages beneath the backing member to retain the clip on the backing member. One claw on one and of the superstructure is pushed past the abutment and nests between the abutment and the body member of the clip in such a way as to lock the superstructure to the wiping element. The superstructure may be disconnected by pivoting the abutment out of alignment with the claw whereupon the superstructure can be slid relative to the wiping element to disengage the two.

The retaining clip is of such a design and construction that it is structurally operative to connect a large majority of the commercially available superstructures to the wiping element. The retaining clip has been made of plastic, but it could be made of metal, and is relatively small and uncomplicated in design and construction thereby making it relatively inexpensive to manufacture and to use. Since the retaining clip is locked to the wiping element, there is no possibility that it will be lost during storage and shipment of the wiping element.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side elevational view of a windshield wiper apparatus embodying the principles of the present invention;

FIG. 2 is a fragmentary enlarged elevational view of the apparatus shown in FIG. 1 with the inventive retaining clip in position;

FIG. 3 is a cross-sectional view through the wiper blade assembly taken along the lines 3—3 of FIG. 2;

FIG. 4 is an enlarged perspective view of the retaining clip of the invention; and FIG. 5 is an enlarged perspective view of the end portion of the superstructure and wiping element showing the retaining clip in position.

DESCRIPTION OF THE PREFERRED EMBODIMENT

Referring to the drawings in more detail, a wiper blade assembly 10 is shown and includes a pressuredistributing superstructure 12 operatively connected to a wiping element 14. The superstructure 12 is comprised of a primary yoke 16 pivotally connected at each end to a pair of secondary yokes 18 with a connector 20 located substantially at the midportion of the primary yoke 16. The connector 20 may be any one of the well-known connectors in common use in the trade. The wiping element 14 comprises a flexible backing strip or support member 22 and a resilient wiping member 24, the wiping member 24 being connected to the backing strip or support member 22 by means of an enlarged bead 26 formed along the back of the resilient wiping member 24, which bead 26 is nested in a longitudinal retention chamber 28 formed in tubular portion 30 of the flexible backing strip or support member 22.

The details of the construction and operation of the resilient wiping member 24 and the flexible backing strip or support member 22 is shown and described in U.S. Pat. No. 3,820,188 in the names of John P. Moorhead and Donald W. Stratton. In brief, the flexible backing strip or support member 22 is preferably an extruded flexible plastic material, such as a glass reinforced polycarbonate, and includes the central tubular portion 30 and has a pair of opposed flanges 32 extending laterally outwardly in opposite directions from a slot 34 opening into the chamber 28 in the tubular portion 30. The flanges 32 have formed along the outside edges thereof an upwardly directed flange 36 which flange 36 has an outwardly directed rib 38 located on the vertical center of gravity of the backing strip or support member 22. The flange 36 and rib 38 add stiffness to the backing strip or support member in the plane parallel to the windshield. Above the flanges 32 and projecting outwardly from the tubular portion 30 of the backing strip 22 are outwardly directed flanges 40 which are spaced from the flanges 32 and have outer edges 42 spaced inwardly from the inner surfaces 44 of the upwardly directed flanges 36. As illustrated, a pair of upwardly projecting ears or ribs 46 extend the full length of the backing strip and are integral with the upper surface of the tubular portion 30 of the backing strip. These ears or ribs 46 add further stiffness to the backing strip, this time in the plane lying perpendicular to the windshield.

The secondary yokes 18 have on each end portion thereof, a pair of inwardly facing claws 48, 50 which claws are of the conventional type and are adapted to engage beneath the flanges 40 on the backing strip. In particular, the outboard pair of claws 48, 50 of yoke 18 are first threaded into the end of the slots or grooves 52 formed between the flanges 40 and 32, which claws are then followed by threading the inboard claws, then the inboard claws followed by the outboard claws of the other yoke 18 are threaded until all four sets of claws 48, 50 are engaged with the flanges 40 of the backing strip. To retain the superstructure on the wiping element, a retaining means 60 of a particularly novel design and construction is provided and, in particular the retaining means 60 as shown in perspective in FIG. 4, comprises a body member 62 having a laterally extending, overhanging head portion 64 connected to the upper portion thereof. At the outer end portion of the head portion 64 depends an angled abutment member 66 which has an inwardly facing wall 68 lying substantially parallel to, spaced from and facing a wall 70 on the body member 62. The forwardly facing surface 72 of the abutment 66 angles or converges from the outermost end of the head portion 64 back down and toward the lower end of the wall 68 until it intersects with said wall 68. Formed substantially in the same plane as the body member 62, head portion 64 and abutment 66, is a foot portion 74 which is connected to the lower end of the body member 62 and extends forward from the connection with said body member and lies substantially parallel with said head portion 64. The body member 62 has a recess or cutout portion 80 formed in the rear wall thereof so as to provide a relatively narrow connecting neck 82 between the body member 62 and a rearwardly extending part 78.

The head portion 64 and the upper portion of the body member 62 and abutment 66 is wider or thicker in a direction perpendicular to the plane of the retaining means with a step-down 84 at the lower portion of the abutment 66 and a step-down 86 in the lower portion of the body member 62, which step-down 86 extends through the narrow neck 82 and throughout the length of the foot portion 74. The step-downs 84 and 86 define shoulders 88 and 90, respectively, for a purpose to be described more completely hereinafter.

The retaining means 60 is assembled to one side of the backing strip 22 in one of two ways. In one form of assembly, the abutment 66 is threaded down in the opening between the edge 42 of the flange 40 and the wall 44 of the flange 36 as the forward edge of the forward part 76 of the foot portion 74 is threaded through the slot 92 cut in the flanges 32 and 40 on one side only of the backing strip 22. The retaining means is urged forward until the wall 70 of the body member 62 approaches the edge of the slot whereupon the overhanging end portion 94 of flange 32 and flange 44 is distorted downwardly until the rearwardly extending part 78 snaps past the end portion 94 whereupon the edge of the slot 92 in the flange 32 seats itself in the cutout or recess 80 in the body member 62 of the retaining means. The shoulder 90 on the body member 62 and the shoulder 88 on the abutment 66 rest on the top surface and outer edge 42 of the flange 40. The forwardly facing surface 72 of the abutment 66 is in alignment with the opening between the outer edge 42 of the flange 40 and the inner surface 44 of the flange 36. Due to the shoulders 88 and 90 resting on the flange 40, the forward part 76 of the foot portion 74 engaging the underside of the flange 32 and the cutout or recess 80 of the body member 62 engaging around the edge of the slot 92 in the flange 32, the retaining means 60 is relatively rigidly seated in the one side of the backing member so that it cannot fall out or be easily knocked out and lost.

In use, the one claw 48 on the outboard end of the yoke 18 is slid in the track between the flanges 32 and 40 of the backing strip 22 until the claw engages with the forwardly facing surface 72 of the abutment 66 whereupon continued relative pressure between the backing strip 22 and the superstructure 12 will cause the claw 48 to cam the abutment 66 upwardly by deflecting the overhanging head portion 64 relative to the body member 62. The claw will slide past the abutment 66 whereupon the resilience of the overhanging head portion 64 of the retaining means 60 will snap the abutment 66 back into position with the shoulder 88 resting on the top edge surface of the flange 40. The claw 48 is now trapped in the opening in the retaining means between the walls 68 and 70 so that the superstructure 12 is held latched to the backing strip 22 of the wiping element 14. The claws are free to move relative to the backing strip so that the wiping element will be permitted to conform to the changing characteristics of the surface of the windshield being wiped.

To remove the superstructure from the wiping element, a finger or tool is placed beneath the overhanging head portion 64 of the abutment 66 for deflecting the overhanging head portion 64 upwardly until the claw 48 can be slid back past the lower extremity of the abutment 66 whereupon release of the head portion 64 and/or abutment 66 will return the abutment to the initial position and the superstructure will be permitted to be slid out of the groove or track in the wiping element to disassemble the superstructure from the wiping element.

As an alternative and preferred way to assemble the retaining means with the backing strip, the cutout or recess 80 in the body member 62 is aligned with the opening in the slot 92 in the side flanges 36 with the forward part 76 and rearward part 78 of the foot portion 74 beneath the flange 32. The retaining means is urged toward the center part of the backing strip so that the body member 62 will deflect the end portion 94 of the side flange 36 as the abutment 66 of the head portion is deflected upwardly to clear the top edge of the flange 36. The body member 62 will snap past the deflected end portion 94 of the side flange 36 so that the retaining means will be in position with the narrow neck 82 of the body member 62 spanning the slot 92. The cutout or recess 80 receives the flange 32 with the rearward part 78 below the flange 32 and the upper surface of the cutout or recess 80 bearing on the top surface of the flange 32. The shoulder 90, on the body member 62, will bear on the top edge of the flange 40 and the shoulder 88, on the abutment 66, will also bear against the top edge of the flange 40. The assembly of the superstructure with the wiping element will be the same as hereinbefore described.

With the retaining means of this invention, it is possible to seat the retaining means in the track of one side of the backing strip so as to readily engage with and retain one claw of the superstructure for holding the superstructure assembled on the wiping element. Superstructures of many different articulated forms currently in use, may be assembled with the wiping element and disassembled therefrom without requiring separate clips or other retaining means. It is almost impossible to lose the clip or to have the clip separate from the wiping element and, therefore, the current problem of losing clips and thereby rendering the wiping element unusable is eliminated. The clip is relatively inexpensive, is highly efficient and overcomes many of the disadvantages of the current designs.

We claim:

1. A retaining clip for a wiper blade for holding a backing member in assemlbed relationship with a superstructure, said retaining clip having a body member of resiliently flexible material with an outwardly extending head portion projecting transversely from the upper portion thereof, an abutment extending downwardly from the outer end portion of said head portion and having a wall lying substantially parallel to and facing a wall of the body member, said abutment and said head portion having an outwardly facing angled wall converging toward the lower edge of said wall on said abutment, and a foot portion connected to said body member and lying parallel to said foot portion, said foor portion being spaced from said head portion and extending in opposite directions from said body portion.

2. The retaining clip of claim 1 wherein said backing member has a pair of spaced apart flanges projecting outwardly from each side thereof, a slot formed in the lower one of said flanges on one side thereof for receiving said body member therein, said foot portion engaging below said lower one of said flanges and said head portion extending parallel to the longitudinal axis of said backing member above said upper one of said flanges, and said abutment projecting downwardly from said upper one of said flanges.

3. A windshield wiper assembly, comprising,
a. an elongate flexible backing member adapted to be attached to a superstructure for supporting a resilient wiping member,
b. said backing member having a pair of continuous laterally opening slots for receiving opposed claws of the superstructure at longitudinally spaced positions, and a longitudinal retention chamber having an opening along the bottom,
c. a retaining clip carried by said backing member for holding the backing member in assembled relationship with the superstructure comprising a body member of resiliently flexible material lying in a plane perpendicular to a plane containing said pair of slots, said body member having a head portion lying in said plane of the body member and projecting laterally from the upper portion thereof,
d. an abutment on the outer end of said head portion and having a vertical wall lying parallel to and facing one wall of the body member,
e. said abutment having an angled wall converging toward the lower edge of said vertical wall,
f. a foot portion connected to said body member and lying parallel to said head portion, said foot portion extending in opposite directions from said body member, and
g. said foot portion engaging below said backing member and holding said head portion and said abutment in position to be engaged by one claw of said superstructure.

4. The wiper assembly of claim 3 wherein said abutment on said head portion engages with a upper flange defining one of said laterally opening slots in the backing member whereby one of the claws of said superstructure engages with and deflects said abutment and said head portion to permit the claw to enter and be trapped by said abutment.

5. A windshield wiper assembly, comprising:
a. an elongate flexible backing member adapted to be attached to a superstructure for supporting a resilient wiping member,
b. said backing member having an upper and a lower flange on each side thereof defining a pair of laterally opening slots for receiving opposed claws of the superstructure at longitudinally spaced positions,
c. a retaining clip of resiliently flexible material carried by the lower one of said flanges on one side of said backing member for holding the backing member in assembled relationship with the superstructure, said clip comprising a body member lying a plane transverse to a plane containing said lower one of said flanges and having a head portion projecting laterally from the upper portion thereof,
d. an abutment extending downwardly from the outer end of said head portion,
e. said abutment and said head portion having an outwardly facing angled wall converging downwardly toward the lower edge of said abutment,
f. a foot portion connected to said body portion and lying parallel to said head portion,
g. said lower one of said flanges having a slot cut therein through which the body member extends with the foot portion below said lower one of said flanges and said head portion and abutment lying parallel to said flanges on the backing member, and
h. said abutment engaging with the upper flange of said one pair of flanges for trapping one claw of the superstructure between said body member.

\* \* \* \* \*

UNITED STATES PATENT AND TRADEMARK OFFICE
CERTIFICATE OF CORRECTION

PATENT NO. : 3,952,360
DATED : April 27, 1976
INVENTOR(S) : John J. Plisky and William H. Harbison It is certified that error appears in the above-identified patent and that said Letters Patent are hereby corrected as shown below:

Face of the Patent, "[75] Inventors:" should read --John J. Plisky, Munster; William H. Harbison, Merrillville, both of Indiana. Under "Other Publications", the Fram Corporation publication should read "Carton for Wiper Blade Refills".

Column 2, lines 56-57, "pressuredistributing" should read --pressure-distributing--.

Column 5, line 8, change "flanges" to --flange--; line 57, change "foot" to --head--; line 58, change "foor" to --foot--; and line 70, after "said" (first occurrence) insert --overhanging head portion and into contact with said--.

Column 6, line 32, change "a" to --an--; line 51, after "lying" insert --in--, and line 69 after "said" insert --abutment and said--.

Signed and Sealed this

Thirty-first Day of August 1976

[SEAL]

Attest:

RUTH C. MASON
Attesting Officer

C. MARSHALL DANN
Commissioner of Patents and Trademarks